United States Patent [19]

Minks

[11] Patent Number: 5,672,955

[45] Date of Patent: Sep. 30, 1997

[54] ALTERNATOR REGULATION OF UNBALANCED CURRENTS WITH TEMPERATURE COMPENSATION

[76] Inventor: Floyd M. Minks, 2700 Partin Settlement Rd., Kissimmee, Fla. 32743

[21] Appl. No.: 499,365

[22] Filed: Jul. 7, 1995

[51] Int. Cl.$^6$ .................................................. H02P 9/30
[52] U.S. Cl. ................................. 322/33; 323/266
[58] Field of Search .................. 322/33, 27, 28, 322/34

[56] References Cited

U.S. PATENT DOCUMENTS

| | | | |
|---|---|---|---|
| 3,450,977 | 6/1969 | Krauss | 322/33 |
| 3,643,153 | 2/1972 | Hanson et al. | 322/33 |
| 3,656,050 | 4/1972 | Airey | 322/28 |
| 3,750,006 | 7/1973 | Kuhn | 322/28 |
| 3,848,177 | 11/1974 | Gynn | 322/73 |
| 4,791,349 | 12/1988 | Minks | 323/226 |
| 5,018,493 | 5/1991 | Minks | 123/335 |
| 5,266,882 | 11/1993 | Morishita | 322/28 |
| 5,374,886 | 12/1994 | Kohl et al. | 322/28 |

Primary Examiner—Steven L. Stephan
Assistant Examiner—Nicholas Ponomarenko
Attorney, Agent, or Firm—Allen, Dyer, Doppelt, Milbrath & Gilchrist, P.A.

[57] ABSTRACT

This invention relates to regulation techniques for alternators typically permanent alternators as might be used on recreational vehicle engines. The regulation techniques previously known under some conditions produce undesirable high direct current components or unbalanced currents in the alternator winding on the alternator. The invention reduces these unbalanced currents thus eliminating the unnecessary source of heating of components and the waste of power. Alternator regulators of the type commonly used on AC systems on snowmobiles typically have a negative temperature coefficient which produces excessive voltage at low temperatures which further adds to effectively increased voltage at the lamps caused by the reduction in wiring resistant at low temperature. The invention produces a selected positive temperature coefficient of a true RMS AC regulator and allows more accurate calibration of that regulator.

4 Claims, 2 Drawing Sheets

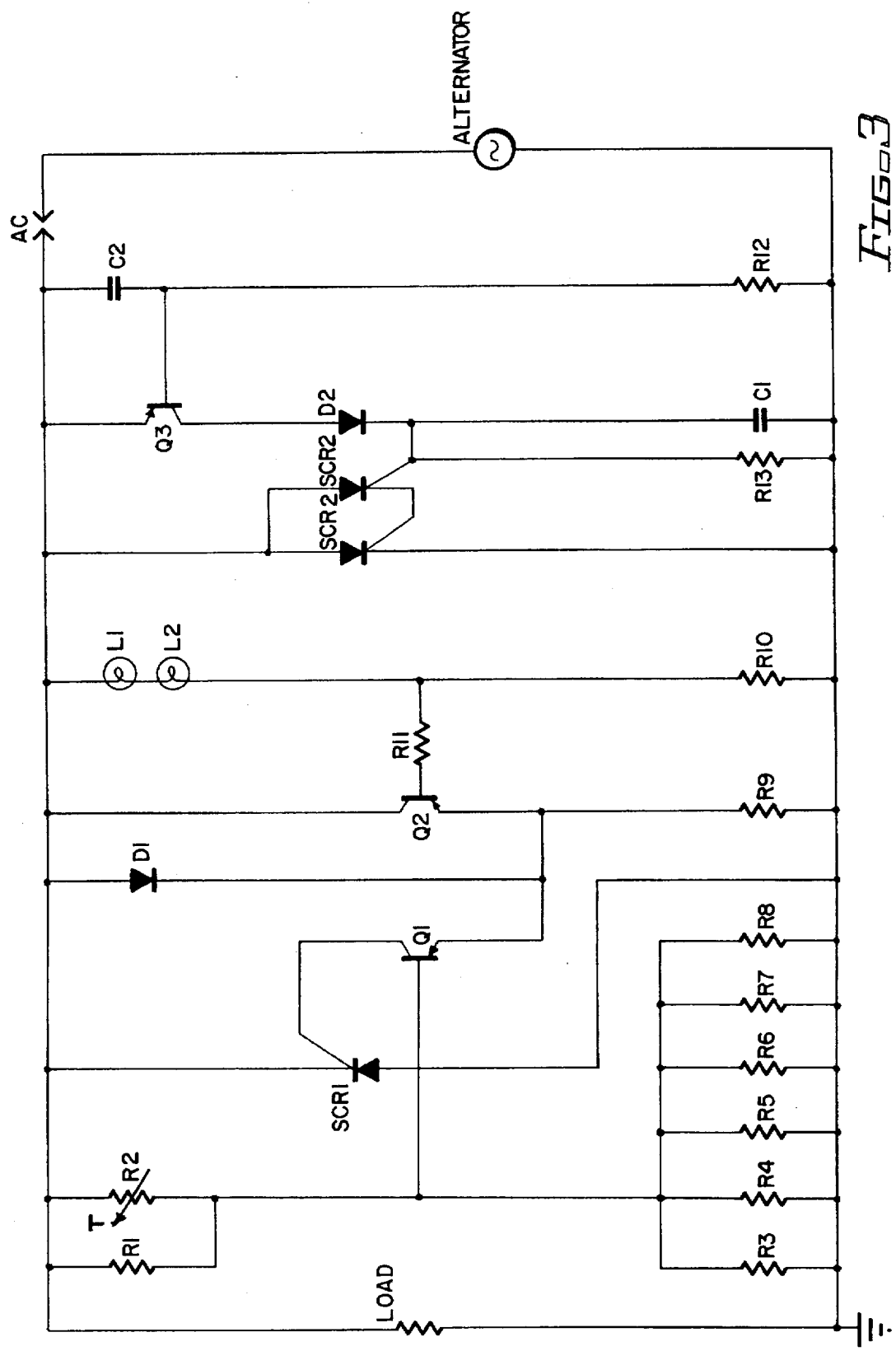

1
ALTERNATOR REGULATION OF UNBALANCED CURRENTS WITH TEMPERATURE COMPENSATION

FIELD OF THE INVENTION

The present invention relates to the field of electrical power, and, more particularly, to an apparatus for generating and controlling electrical power, such as for a vehicle.

BACKGROUND OF THE INVENTION

A recreational vehicle, such as a snowmobile, for example, is typically powered by an internal combustion engine which, in turn, propels the vehicle and also drives a permanent magnet alternator. The alternator produces electrical energy necessary for lighting and other systems on the vehicle. The voltage and frequencies of the alternator typically vary with engine speed, which, in turn, varies with the operating conditions of the vehicle. Accordingly, some type of regulation is generally necessary to prevent the burning out of head lights and other electrical loads, for example, of the vehicle.

The circuit of FIG. 1 shows a half-wave shunt regulator of a type that is known and has been widely used for many years in the industry as is also described in U.S. Patent No. Re. 29,245, of U.S. Pat. No. Re. 3,924,154. Understanding of the operation of this circuit will be readily grasped by those skilled in the art. This circuit includes a bridge circuit with three linear resistors R2, R3, and R10, and one non-linear resistor which is typically one or two tungsten filament lamps shown in L1 and L2. The bridge goes through a balance condition at a desired true RMS voltage from AC to ground.

Transistors Q1 and Q2 amplify the output voltage from this bridge and drive the gate of SCR1 which is a half-wave shunt regulator from the AC input to ground. Because a typical permanent magnet alternator is highly inductive, considerable phase shift may occur when SCR1 is on, thereby allowing the reduction of the output voltage well below the 50% which might initially be assumed possible.

The illustrated circuit also includes no compensation for ambient temperature variations and in effect measures the temperature of the filaments of Lamps L1 and L2. Accordingly, this circuit has a slight negative temperature coefficient, which in some applications is undesirable. Circuits of this type have generally been calibrated by selecting resistor R3 which unfortunately does not allow as accurate an adjustment as would be desirable in some applications.

The amount of regulation available particularly at high engine speed and minimum electrical load conditions may not be sufficient, particularly with an alternator having over six poles. A six pole alternator may have relatively less inductance compared to resistance than a four pole type, as has been more commonly used over the past thirty years. Since the circuit of FIG. 1 is a half-wave circuit, a DC component is produced in the alternator winding by the regulator. When in operation on a newer high output twelve pole permanent magnet alternator, additional heating caused by this DC component may be sufficient to cause a failure of the alternator winding at minimum electrical load and maximum engine speed.

SUMMARY OF THE INVENTION

In view of the foregoing background, it is therefore an object of this invention to overcome the limitations of the known technology typical of FIG. 1.

This and other objects, features, and advantages of the present invention are provided by a power generation system comprising a first solid state switch for controlling transfer of electrical power from an alternator to a load; a voltage sensitive network operatively for controlling a voltage across the load; and a second solid state switch for controlling current flow from alternator to the load in an opposite direction relative to current flow controlled by the first solid state switch. The system also preferably includes a second network sensitive to average voltage across an alternator winding and having an output connected to the second solid state switch for controlling current flow from the alternator to the load in the opposite direction of the current controlled by the first solid state switch so that the second solid state switch conducts to minimize a direct current voltage across an alternator winding that would otherwise exist as a result of the conduction of the first solid state switch.

Another aspect of the invention is directed to a system for controlling the flow of power from an alternator through a load, and wherein the system comprises first and second solid state switches connected to conduct at opposite half cycles of the alternator. The first solid state switch is sensitive to a voltage across the load, and the second solid state switch is sensitive to an average voltage across the alternator winding.

The invention is also directed to an AC true RMS voltage regulator for a lighting system to compensate for variations therein based upon temperature variation and wiring of the lighting system. The AC true RMS regulator preferably comprises: a bridge circuit for sensing and controlling a calibration and temperature coefficient of voltage of the lighting system. The bridge circuit comprises first and second branches, and wherein the first branch comprises at least one lamp in series with a fixed resistor. The second branch comprises a first leg of one or more resistors connected in series or parallel, one of the resistors having a known temperature coefficient. The second leg comprises a primary resistor and at least three additional resistors connected in parallel to facilitate calibration of the bridge by selectively removing some combination of the parallel resistors.

Another embodiment of the invention is directed to a system for controlling the voltage in a lighting system. The system comprises an alternator having a winding; one or more lamps connected to the alternator as a load; and a half wave shunt regulator connected to the alternator and the one or more lamps. The half wave shunt regulator preferably comprises a first solid state switch, a first solid state switch voltage sensitive network for controlling conduction through the first solid state switch to control one polarity of current flow of the alternator, and second solid state switch means for controlling current as a shunt across the alternator winding in an opposite direction of the first solid state switch. The half wave shunt regulator also preferably comprises a capacitor and resistor connected in a series across the alternator winding, and a first amplifying device comprising an input terminal, an output terminal, and a common input-output terminal. The common input-output terminal is connected to a junction of the capacitor and the alternator winding, and the input terminal is connected to a junction of the resistor and the capacitor. A diode connects the output terminal of the amplifying device to an input of the second solid state switch means so that the second solid state switch means is responsive to an average DC voltage across the alternator winding to reduce the magnitude of the average DC voltage.

BRIEF DESCRIPTION OF THE DRAWINGS

FIG. 3 is a schematic diagram of another embodiment of a power generation and regulation circuit according to the present invention.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, applicant provides these embodiments so that this disclosure will be thorough and complete, and will fully convey the scope of the invention to those skilled in the art. Like numbers refer to like elements throughout.

Figure 1:
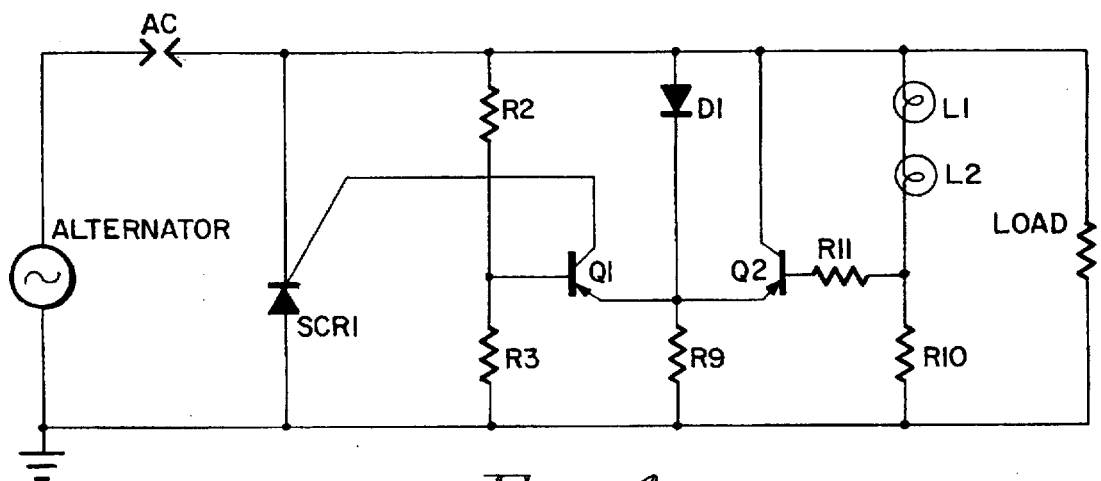
FIG. 1 is a schematic diagram of a power generation and regulation circuit according to the prior art.
Figure 2:
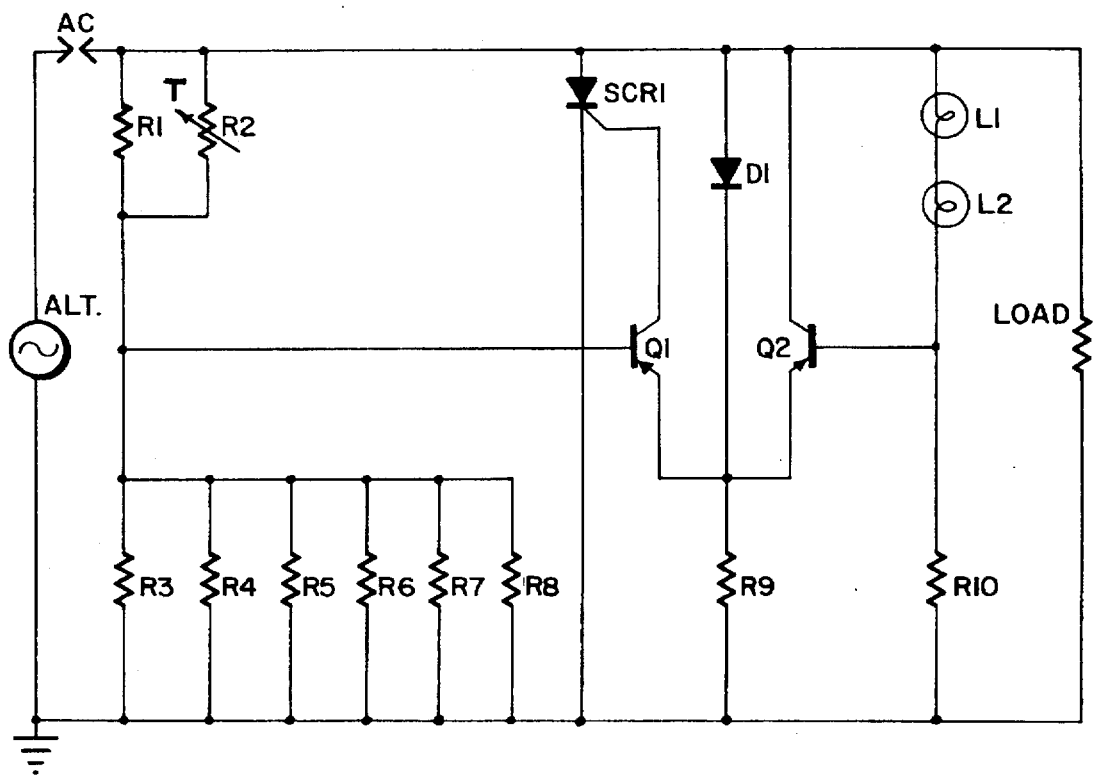
FIG. 2 is a schematic diagram of an embodiment of a power generation and regulation circuit according to the present invention.

FIG. 2 is a circuit diagram of one embodiment of the present invention and is similar to the circuit shown in FIG. 1 with the addition of components R1, R4, R5, R6, R7 and R8. As is typical in a vehicle, such as a snowmobile, the regulator will be connected near and directly across the alternator wires and from this connection point will go through a headlight switch to the head lamp with reasonably sized wire. The voltage drop from the regulator connection point to the head lamp in the vehicle wiring is not negligible.

It is known that copper wire has a positive temperature coefficient; therefore, even if the regulator was perfect as far as zero change of voltage with temperature, the voltage of the head lamp would undesirably decrease at high temperature and increase at low temperature. Therefore, to compensate for this, as well as the previously described negative coefficient of the circuit of FIG. 1, it is desirable to create a regulator with a positive temperature coefficient of a magnitude to cancel the temperature coefficient of the vehicle wiring. Accordingly, as illustrated in FIG. 2, resister R2 is therefore parallel with resistor R1, which is a commercially available type with a known linear positive temperature coefficient.

Resistor R3 is connected in parallel with resistors R4, R5, R6, R7 and R8. By selecting the values of these resistors so that R5 is approximately twice the resistance of R4, R6 twice the resistance of R5, R7 twice the resistance of R6, and R8 twice the resistance of R7, the regulator can be calibrated to extreme accuracy by clipping out the required resistors in the series of R4 and R8. Typical values for purposes of illustration and understanding, but not in any way to limit the scope of the application of this invention, for a 14 volt nominal electrical system could be: 5 volt 115 milliampere lamps for L1 and L2 (Type 715) and R1 may be a 10,000 ohm, plus 3000 Part Per Million Per Degree C resistor. In addition, R2 may be 681 ohm, R3 may be 681 ohm, R4 may be 8.66 Kohm, R5 may be 16.5 Kohm, R6 may be 32.4 Kohm, R7 may be 63.4 Kohm, and R8 may be 124 Kohm. A different ratio between R1 and R2 could be chosen by one skilled in the art to produce a different final coefficient of the entire circuit of FIG. 2.

The circuit of FIG. 2 compared to the prior art circuit of FIG. 1 permits greater accuracy of calibration at the calibration temperature which would typically be room temperature, and also eliminates the increase in headlight voltage at lower temperatures that snowmobiles operate at. Thus, the actual calibration voltage can be set higher without danger of burning out the light bulbs at low temperature.

Since it is known that the light output of tungsten filament or halogen head lights increases very rapidly with voltage, considerable gain in effective lighting efficiency can be realized without a decrease in head lamp life using the circuit of FIG. 2 compared to the circuit of FIG. 1.

As previously described, it should also be realized that the circuit of FIG. 2 does produce a considerable DC voltage across the alternator winding. Moreover, this voltage under conditions of maximum engine RPM and minimal electrical load can typically be two to four volts, thereby producing considerable heating in the alternator winding. Therefore, the circuit of FIG. 2 is preferably only used with alternators with sufficient heat dissipation capability to prevent failure from this heating.

The relatively high current which produces the heating in the winding just as described also produces considerable heating in SCR1. Accordingly, the current rating of SCR1 typically would have to be considerably higher in amperes than the maximum load current that could be obtained from the alternator that it regulates. As a practical matter, SCR's are readily available inexpensively in current ratings up to approximately 25 amps which may not be sufficient to regulate some of the larger snowmobile alternators today with the circuit of FIG. 1 or FIG. 2.

SCR's with a higher rating, such as 50 amperes, are much more than twice the price in the marketplace today than the 25 amp SCR's. The circuit of FIG. 3 reduces the DC current through the alternator winding to a negligible value and also reduces the current through SCR1 thus allowing much larger alternators to be regulated with a given current rating SCR. The left hand portion of FIG. 3 is identical to FIG. 2 and functions in a similar manner. Note that the right hand portion of FIG. 3 is connected only to the AC and ground lines, and not directly to the voltage sensing portion of the regulation circuit of FIG. 2. The remaining components in FIG. 3 effectively measure the DC voltage across the alternator winding and turn on SCR2 as required to minimize or reduce to a negligible value that voltage.

The current through SCR1 under some conditions is actually reduced more than the current through SCR2. SCR2 is shown connected in a Darlington configuration with SCR3. Typically, SCR2 might be a 25 amp SCR and SCR 3 a one-half amp device. Thus, the combination would have a 25 amp RMS current capability and with readily available components a gate current to fire of less than 20 microamps. Any other devices could be substituted by one skilled in the art for this combination of SCR2 and SCR3, such as, for instance, a MOS controlled SCR.

Since SCR1 clips a portion of the negative half cycle of the AC voltage with respect to ground, a positive DC voltage on the AC line with respect to ground will result when SCR1 is on during the required portion of the waveform to control the RMS output voltage. The time constant between C2 and R12 is selected to effectively filter out the alternator frequency; however, the DC component will appear across C2. The DC component is available to drive the base emitter junction of transistor Q3 which is connected through diode D2 to the gate of SCR3. Resistor R13 and capacitor C1 prevent the undesirable turn on of SCR3 from leakage currents or from short duration transients which may occur on the collector of Q3, even without a base emitter voltage.

Thus, components R12, C2, Q3, D2, C1, R13 and SCR2 and SCR3 effectively sense the DC voltage from the AC line to ground and reduce this voltage to a minimum value typically below one volt under all operating conditions. It would be realized by one skilled in the art that even though these components are not directly connected to the RMS sensing circuit typical of FIG. 2, that the actual RMS regulation of the entire circuit will be improved as well as the dissipation in the alternator winding and in SCR1 being greatly decreased. Thus all the components of FIG. 3 function as a relatively simple and effective full-wave shunt AC regulation system.

It will be noted by one skilled in the art that since each SCR is on for only half the cycle, problems do not exist in this circuit in turning off or commutating off the SCR's. As an aid to understanding, but not as a limitation, typical values that have been found effective in this circuit are C1=0.001 uF, C2=0.1 uF; R12=511K, R13=16.5K, R10=69.8 ohms, R11=150 ohms, and R9=340 ohms. In addition, Q1, Q2 and Q3 may be MPSA 56 transistors, D1 and D2 may be 1N914 diodes, SCR3 may be a model MCR100-5, SCR1 and SCR2 may be model 2N6506, and L1 and L2 may be lamp type 715.

Where an electrical system on a vehicle, such as a snowmobile or four wheel recreational vehicle or outboard motor, includes a permanent magnet alternator to supply power to a DC electrical system commonly containing a battery, full-wave or bridge rectification means are commonly used to control the flow of power from the alternator to the battery. In a conventional circuit, this bridge includes two diodes and two silicon controlled rectifiers, and the gates of both SCRs are connected to a control circuit which is sensitive to the DC voltage of the battery. This permits the full output of the alternator to charge the battery when it is discharged, and prevents overcharging of the battery.

A problem sometimes exists in a system of this type just as the battery nears its fully charged state or the set regulator voltage. As the battery requires slightly less current than the alternator is capable of producing, rather than both SCR's in the bridge equally reducing the percentage of the time they are on, the reduction is sometimes initially on one SCR only. In the extreme case, one SCR may be on all the time and the other SCR never on. This produces the same problem previous described with reference to FIG. 2 of excessive heating in the alternator winding and excessive current in the SCR. The designer then is left with the choice of using larger more expensive components or tolerating the extra heating in this mode if it is understood. This additional heating may cause SCR or alternator failure.

The teaching of this invention, specifically the right hand portion of FIG. 3, can be used to solve this problem. In the rectification system of the bridge charging a battery, one SCR can be made sensitive to the battery voltage as is commonly done in the art. The second SCR rather than being made sensitive to the battery voltage could then, by the teaching of this invention, be made sensitive to the DC or average voltage across the alternator winding in a manner to reduce that voltage to zero. Accordingly, sharing of the loads between both half cycles of the alternator and between the semiconductors, typically silicon controlled rectifiers and diodes, is assured in the rectification high current path. It should be understood that multiple circuits of this type just described could be used with a multiple phase alternator, thus, sharing equal load sharing between the various phases such as the three phases of a three phase machine and between the opposite polarity cycles of each phase load as used herein may include a lamp, a battery, or other electrical loads. Examples of batteries or lamps have been used in describing applications where they are most common, but this is not to be taken as a restriction to a specific load in the teaching of this invention.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed:

1. A voltage regulation system comprising:
   an engine driven alternator and a load connected thereto, the alternator having an alternator winding;
   a first solid state switch for controlling transfer of electrical power from said alternator to said load;
   a voltage sensitive network operatively connected to said first solid state switch for controlling a voltage across said load;
   a second solid state switch for controlling current flow from said alternator to said load in an opposite direction relative to current flow controlled by said first solid state switch; and
   a second network sensitive to average voltage across an alternator winding and having an output connected to said second solid state switch for controlling current flow from said alternator to said load in the opposite direction of the current controlled by said first solid state switch so that said second solid state switch conducts to minimize a direct current voltage across said alternator winding that would otherwise exist as a result of the conduction of said first solid state switch.

2. A voltage regulated system comprising:
   a lighting system comprising:
      a source of electrical power;
      a lamp serving as a load;
      a voltage regulator;
      wiring for connecting said lamp to said source of electrical power, said wiring having a positive temperature coefficient of resistance; and
   a bridge circuit for sensing and controlling a calibration and temperature coefficient of voltage of the lighting system, said bridge circuit comprising first and second branches, said first branch having at least one lamp in series with a fixed resistor, said second branch comprising:
      a first leg of one or more resistors connected in series or parallel, one of said resistors having a known temperature coefficient; and
      a second leg comprising a primary resistor and at least three additional resistors connected in parallel to facilitate calibration of said bridge by selectively removing some combination of the parallel resistors.

3. A system for controlling the voltage in a lighting system, said system comprising:
   an alternator having a winding;
   one or more lamps connected to said alternator as a load;
   a full-wave shunt regulator connected to said alternator and said one or more lamps, said half-wave shunt regulator comprising:
      a first solid state switch;
      a first solid state switch voltage sensitive network for controlling conduction through said first solid state switch to control one polarity of current flow of the alternator;
      second solid state switch means for controlling current as a shunt across the alternator winding in an opposite direction of said first solid state switch;
      a capacitor and resistor connected in a series across said alternator winding;

a first amplifying device comprising an input terminal, an output terminal, and a common input-output terminal, said common input-output terminal connected to a junction of said capacitor and said alternator winding, said input terminal connected to a junction of said resistor and said capacitor;

a diode connecting the output terminal of said amplifying device to an input of the second solid state switch means so that said second solid state switch means is responsive to an average DC voltage across said alternator winding to reduce the magnitude of the average DC voltage.

4. A system for controlling the voltage in a lighting system, said system comprising:

an alternator having a winding;

one or more lamps connected to said alternator as a load;

a half-wave shunt regulator connected to said alternator and said one or more lamps, said half-wave shunt regulator comprising:

a first solid state switch; and a first solid state switch voltage sensitive network for controlling conduction through said first solid state switch to control one polarity of current flow of the alternator; and a second half-wave shunt regulator connected to said alternator, said second half-wave shunt regulator comprising:

a second solid state switch means for controlling current as a shunt across the alternator winding in an opposite direction of said first solid state switch;

a capacitor and resistor connected in a series across said alternator winding;

a first amplifying device comprising an input terminal, an output terminal, and a common input-output terminal, said common input-output terminal connected to a junction of said capacitor and said alternator winding, said input terminal connected to a junction of said resistor and said capacitor; and a diode connecting the output terminal of said amplifying device to an input of the second solid state switch means so that said second solid state switch means is responsive to an average DC voltage across said alternator winding to reduce the magnitude of the average DC voltage.

* * * * *